Patented Jan. 24, 1939

2,145,051

UNITED STATES PATENT OFFICE 2,145,051

HALOGENATED PERI-NAPHTHINDENONES

Karl Koeberle, Werner Rohland, and Christian Steigerwald, Ludwigshafen-on-the-Rhine, Germany, assignors to General Aniline Works, Inc., New York, N. Y., a corporation of Delaware No Drawing. Application June 12, 1937, Serial No. 147,920. In Germany June 25, 1936

10 Claims. (Cl. 260—131)

The present invention relates to halogenated naphthindenones.

We have found that valuable halogenated naphthindenones can be obtained by causing halogenating agents to act on naphthindenones. Naphthindenone itself has the following formula

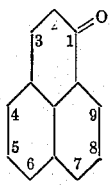

As starting materials, not only naphthindenone itself but also any derivatives thereof may be used as for example those containing amino or substituted amino groups.

As halogenating agents there may be mentioned, besides the halogens themselves, for example phosphorus halides, sulphuryl chloride and phosgene. Generally speaking the halogenation is carried out in the presence of diluents such as water, carbon tetrachloride, glacial acetic acid, sulphuric acid of various concentration, chlorsulphonic acid, nitrobenzene or trichlorbenzene. The use of a diluent, however, is in many cases not necessary. In some cases it is preferable to add catalysts which favor the halogenation, such as iodine, iron, sulphur, zinc halides or dimethylaniline. By varying the reaction conditions as to the temperature, the kind and quantity of halogenating agent, the time of halogenation, the catalyst and the diluent, more or less halogenated products are obtained.

Another method for producing halogenated naphthindenones consists in reacting glycerine in the presence of sulphuric acid with halogenated naphtholes. Suitable naphtholes are, for example, 2-bromo-naphthol (1); 2-chloro-naphthol (1); 2-fluoronaphthol (1), 3-halogen-naphthols (2). The reaction may be illustrated by the following equation

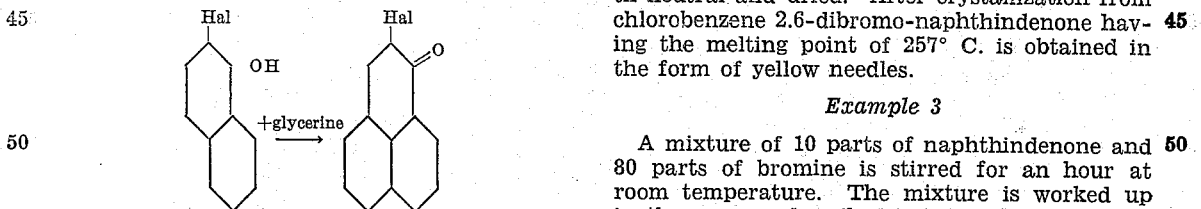

According to both methods of working, the reaction products are generally obtained in a very pure state. If necessary they may be purified in the usual manner, for example by crystallization, sublimation, crystallization in stages from sulphuric acid or by extracting them with suitable solvents.

The halogenated naphthindenones thus obtained are in part valuable intermediates for the preparation of dyestuffs and in part valuable dyestuffs themselves.

The following examples will further illustrate how the said invention is carried out in practice but the invention is not restricted to these examples. The parts are by weight.

Example 1

250 parts of bromine are slowly added to a solution of 180 parts of naphthindenone in 1800 parts of glacial acetic acid at a temperature of from 60° to 70° C. while stirring. The red needles separating are most probably the bromohydrate of the reaction product. After stirring for an hour at 90° C. the mixture is allowed to cool, the red precipitate is filtered off by suction, washed with glacial acetic acid and then with water. By washing with water the red coloration of the precipitate turns yellow, the said bromohydrate being hydrolized. The yellow reaction product is dried and crystallized from methanol or isobutyl-alcohol. The 2-bromonaphthindenone thus obtained forms yellow needles which melt at from 151° to 152° C.

The same compound is obtained if carbontetrachloride or nitrobenzene are employed instead of glacial acetic acid as diluents.

Example 2

A mixture of 25 parts of 2-bromo-naphthindenone (prepared according to Example 1) and 125 parts of bromine is heated while stirring at 50° C. for half an hour. The solution is then poured into a diluted solution of sodium hydroxide whereupon the separted yellow precipitate is filtered off by suction, washed with water until neutral and dried. After crystallization from chlorobenzene 2.6-dibromo-naphthindenone having the melting point of 257° C. is obtained in the form of yellow needles.

Example 3

A mixture of 10 parts of naphthindenone and 80 parts of bromine is stirred for an hour at room temperature. The mixture is worked up in the manner described in Example 2. The dibromonaphthindenone thus obtained is identical with that of Example 2.

Example 4

235 parts of bromine are slowly added to a mixture of 100 parts of naphthindenone, 400 parts of nitrobenzene, 2 parts of iodine and 1 part of iron powder at from 80° to 100° C. and the mixture is stirred at the said temperature until the reaction is completed. After cooling the reaction product is filtered off by suction, washed with methanol and dried. It is a tri-bromo-naphthindenone, which contains one bromine atom in the 2-position. It dissolves in concentrated sulphuric acid giving a red coloration.

Example 5

A mixture of 5 parts of naphthindenone, 60 parts of bromine and 0.5 part of iodine is boiled under reflux for 8 hours. After cooling the reaction mixture is poured into a diluted sodium hydroxide solution and worked up in the usual manner. The tetra-bromo-naphthindenone thus obtained forms yellow needles when crystallized from dichlorbenzene. It dissolves in concenrated sulphuric acid giving a red coloration.

Example 6

A mixture of 100 parts of naphthindenone, 500 parts of trichlorobenzene and 5 parts of iodine is heated while stirring at 100° C. and chlorine is led through the mixture for several hours. After cooling the tetrachloronaphthindenone separated is filtered off by suction, washed with methanol and dried. The new compound thus obtained contains one chlorine atom in the 2-position.

Example 7

A mixture of 500 parts of 1-hydroxy-2-chloro-naphthol, 300 parts of a 64 per cent aqueous solution of sulphuric acid, 500 parts of glycerine, 400 parts of nitrobenzene sulphonic acid and 15 parts of ammonium vanadate is boiled for an hour while stirring. After cooling to 90° C., 3500 parts of water are added and the dark viscous reaction product is separated from the solution by decantation. The residue is boiled with an aqueous solution of sodium hydroxide, filtered off by suction while hot, washed with water until neutral and dried. By crystallization from isobutylalcohol or by sublimation in vacuo the 2-chloro-naphthindenone is obtained in the form of yellow needles having a melting point of 154° C.

Example 8

10 parts of bromine are allowed to flow at 80° C. during several hours into a mixture of 10 parts of 2-chloronaphthindenone, 100 parts of nitrobenzene and 0.5 part of bromine while stirring. After cooling the resulting compound is filtered off by suction, washed with methanol and dried. After recrystallization from ethanol, butanol or chlorobenzene the 2-chloro-6-bromo-naphthindenone is obtained in the form of yellow needles having a melting point of from 250° to 252° C. It dissolves in concentrated sulphuric acid giving a yellow-red coloration.

Example 9

10 parts of finely powdered 2-chloro-naphthindenone are slowly added while stirring to 50 parts of bromine. Stirring is continued for half an hour. The whole is then poured into an aqueous solution of sodium hydroxide and worked up in the usual manner. The yellow reaction product thus obtained is 2-chloro-6-bromo-naphthindenone (cf. Example 8).

Example 10

A slow current of gaseous chlorine is led through a mixture of 5 parts of naphthindenone, 100 parts of chlorosulphonic acid and 0.5 part of iodine for an hour at 80° C. while stirring. After cooling the reaction mixture is poured into ice water, the yellow precipitate filtered off by suction, washed with water until neutral and dried. After crystallization from chlorobenzene, a halogenated naphthindenone is obtained which contains, besides one chlorine atom in the 2-position, some other chlorine atoms. It dissolves in concentrated sulphuric acid giving a yellow red coloration.

Example 11

To a solution of 10 parts of 2-aminonaphthindenone (prepared from 2-chloro-naphthindenone by reacting with para toluene sulphonic acid amide and saponification with concentrated sulphuric acid) in 100 parts of glacial acetic acid there is slowly added at from 50° to 60° C. while stirring a solution of 10 parts of bromine in 30 parts of glacial acetic acid. The mixture is then heated to about 90° C. and heating is continued for about an hour. The whole is then allowed to cool and the yellow crystals separated are filtered off by suction, washed with water (the yellow color of the crystals thereby turns red on account of the hydrolysis of the bromohydrate) and dried. After crystallization from isobutanol a bromo-2-amino-naphthindenone is obtained in the form of red needles having a melting point of from 187° to 188° C. It dissolves in concentrated sulphuric acid giving a yellow red coloration and dyes acetate artificial silk yellow red shades.

Example 12

A mixture of 5 parts of naphthindenone-2-carboxylic acid, 40 parts of bromine and 0.5 part of iodine is boiled under reflux for 2 hours. After cooling the mixture is poured into water and the excess bromine is removed by sodium bisulphite solution; the precipitate is filtered off by suction, washed with water and methanol and dried. The new compound thus obtained is a monobromo-naphthindenone-2-carboxylic acid, the bromine of which stands probably in the 6-position. It may be purified by dissolving it in sodium or potassium hydroxide solution and reprecipitation by dilute mineral acids.

What we claim is:—
1. A halogenated peri-naphthindenone.
2. A halogenated peri-naphthindenone containing up to four halogen atoms.
3. A chlorinated peri-naphthindenone.
4. A monochloro peri-naphthindenone.
5. 2-chloro peri-naphthindenone.
6. A brominated peri-naphthindenone.
7. A monobromo peri-naphthindenone.
8. 2-bromo peri-naphthindenone.
9. A peri-naphthindenone containing chlorine and bromine.
10. 2-chloro-6-bromo peri-naphthindenone.

KARL KOEBERLE.
WERNER ROHLAND.
CHRISTIAN STEIGERWALD.